H. A. BORRESEN.
MAINSPRING BARREL FOR TIMEPIECES.
APPLICATION FILED SEPT. 4, 1915.
1,392,676.
Patented Oct. 4, 1921.
4 SHEETS—SHEET 1.
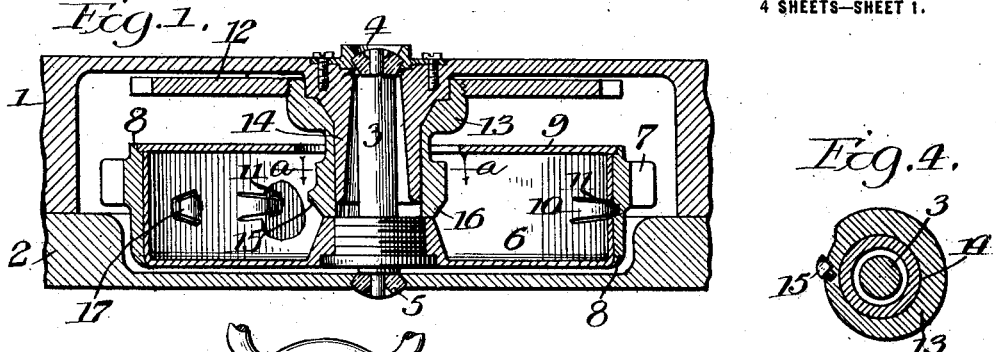
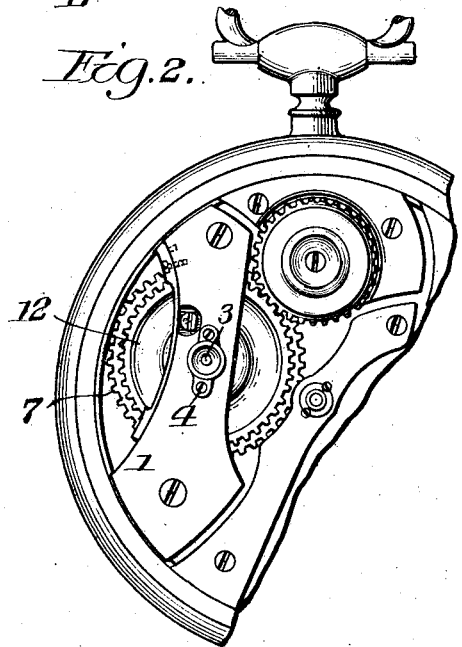
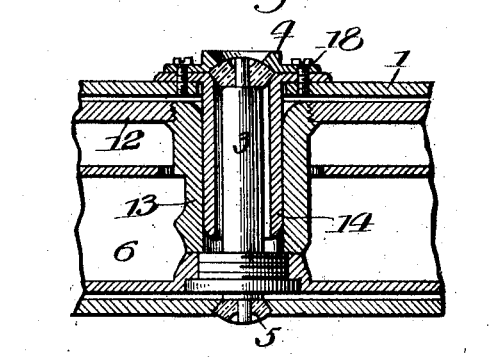
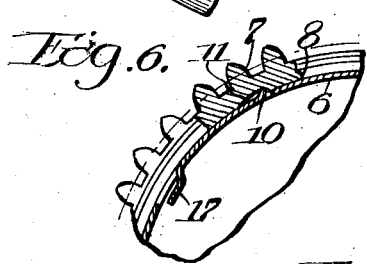
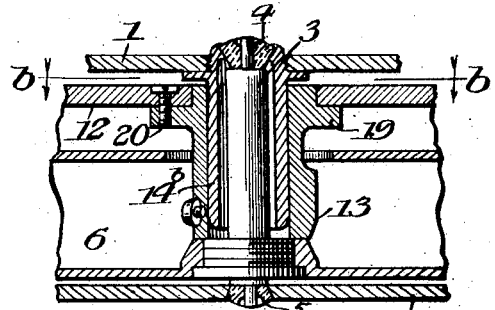
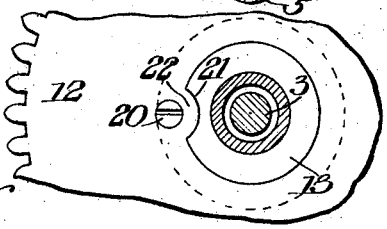
Inventor
Helge A. Borresen
by May H Zabel Atty.

H. A. BORRESEN.
MAINSPRING BARREL FOR TIMEPIECES.
APPLICATION FILED SEPT. 4, 1915.
1,392,676.
Patented Oct. 4, 1921.
4 SHEETS—SHEET 2.
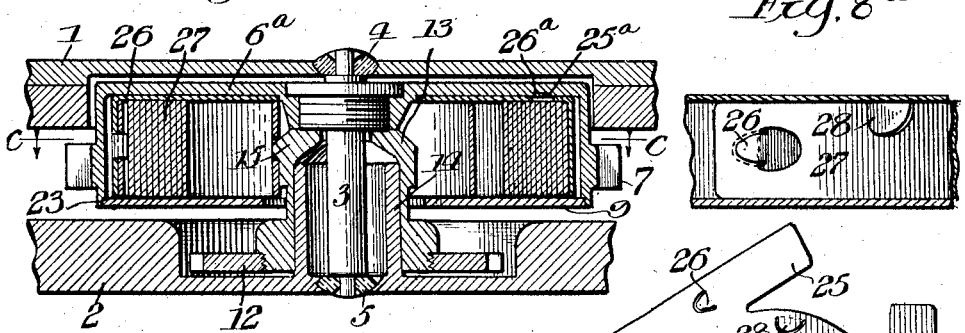
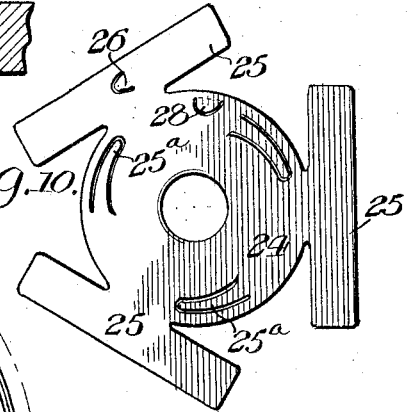
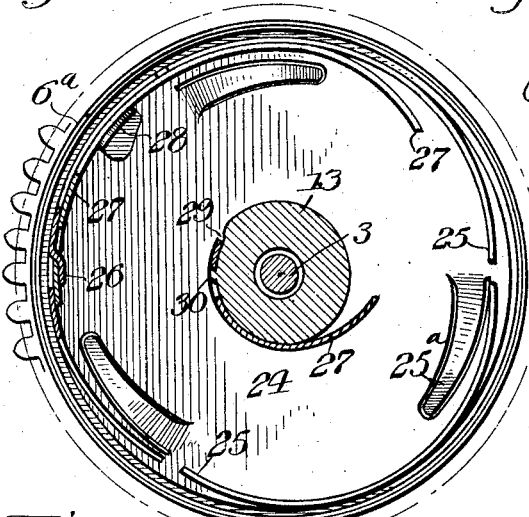
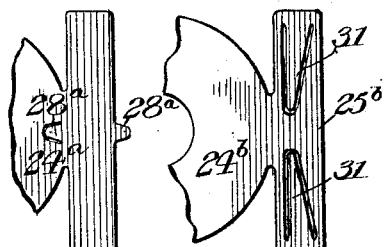
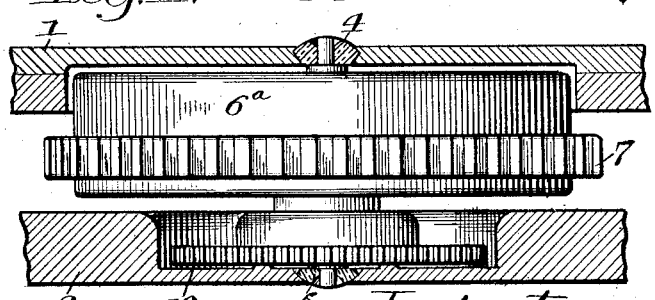
Inventor
Helge A. Borresen
by [signature] Atty

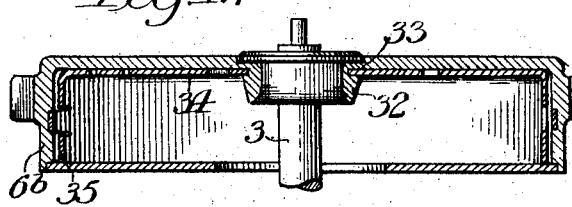
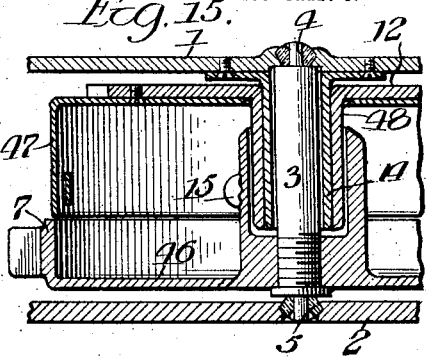
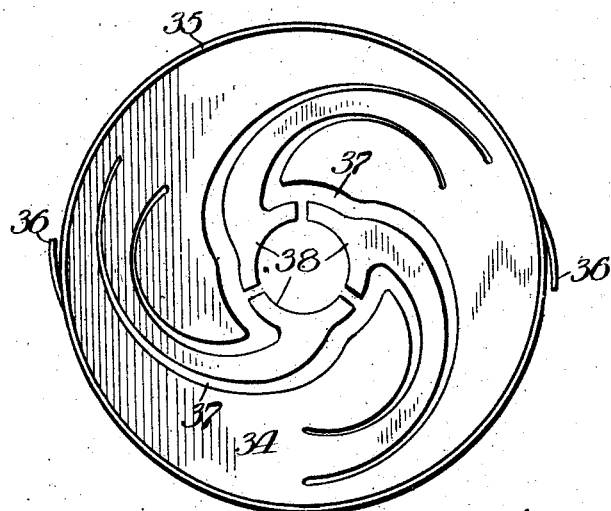
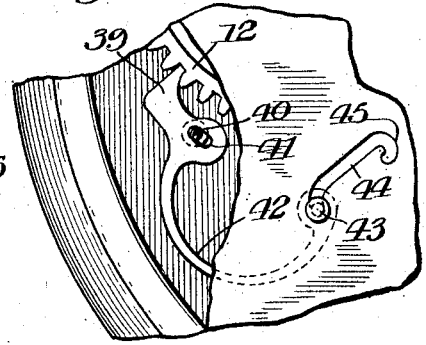
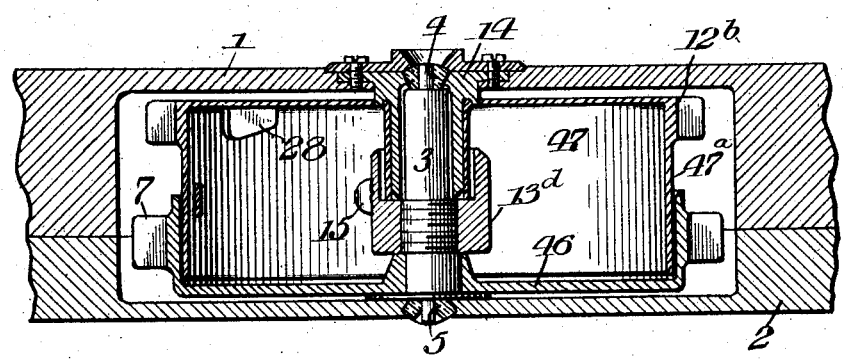

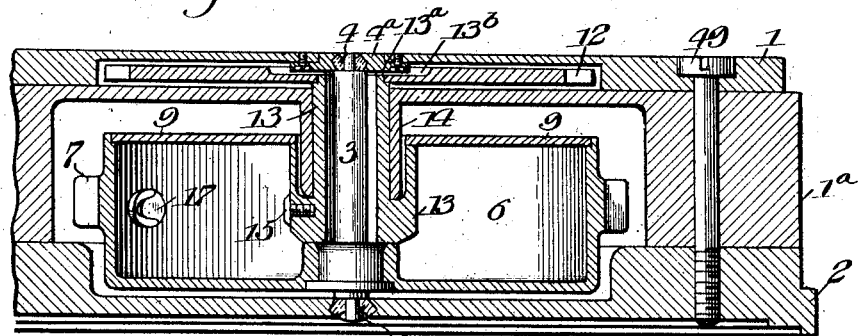

UNITED STATES PATENT OFFICE.

HELGE A. BORRESEN, OF MARQUETTE, MICHIGAN.

MAINSPRING-BARREL FOR TIMEPIECES.

1,392,676.          Specification of Letters Patent.      Patented Oct. 4, 1921.

Application filed September 4, 1915. Serial No. 48,982.

*To all whom it may concern:*

Be it known that I, HELGE A. BORRESEN, a citizen of the United States, residing at Marquette, in the county of Marquette and State of Michigan, have invented a certain new and useful Improvement in Mainspring-Barrels for Timepieces, of which the following is a full, clear, concise, and exact description, reference being had to the accompanying drawings, forming a part of this specification.

My invention relates to main spring barrels for watches, and more particularly to that type of main spring barrels with which the driving or main wheel is rigidly attached to or assembled with the main arbor, the main arbor providing at its extremities the going bearings. The object of my invention is to provide a simple inexpensive structure that may be readily incorporated in watch models as at present designed and thus without radical change in the watch itself. The structure is equally applicable with winding mechanisms in which the winding wheel is adjacent either to the lower plate or the upper bridge, and is likewise readily applicable or adaptable irrespective of whether the spring is wound up from the inner or the outer coils.

My invention further contemplates the provision of safety mechanism to render it simple and harmless to let down the power of the main spring during the course of repairs or otherwise; further structures disclosed herein preventing injury to the watch train including the main wheel arbor bearings in the event of main spring breakage.

The structure furthermore affords a simplified construction which can be very readily taken apart or assembled, various parts thereof telescoping in a manner to permit of this in the particular form of the invention as herein disclosed.

It may be stated as a further general object of the invention to provide a main arbor suitably held in jewel or other equally satisfactory bearings, which bearings are mounted upon the rigid elements of the movement, thus insuring stability and avoiding dual wear.

The invention contemplates that the winding mechanism associated with this main arbor shall perform its functions without in any way placing said arbor under stress or without using said arbor as a bearing for any of the parts mentioned.

My invention further contemplates the provision of means for permitting recoil functions associated directly with the main spring barrel or its immediately adjacent parts, thus simplifying the recoil structure, and thus having the allowances necessary for this recoil as close to the recoiling portion of the spring as possible without utilizing other portions of the movement.

The invention further contemplates provision of means for giving support to the winding wheel at the point of its location and also support for the hollow winding hub at the point of the main spring pull.

I will describe in the accompanying drawings one or more embodiments of my invention, in which drawings:

Figure 1 is a transverse sectional view of a barrel structure constructed in accordance with my invention;

Fig. 2 is a top view of said structure incorporated in a fragmentary view of a watch;

Fig. 3 is a fragmentary view similar to Fig. 1 showing a modified form;

Fig. 4 is a partial sectional view on line *a—a* of Fig. 1;

Fig. 5 is a view similar to Fig. 3 of a further modification;

Fig. 6 is a fragmentary sectional view through substantially the central plane of the barrel shown in Fig. 1;

Fig. 7 is a fragmentary sectional view along line *b—b* of Fig. 5;

Fig. 8 is a sectional view similar to Fig. 1 showing the parts reversed so that the winding wheel is on the dial side of the watch;

Fig. 8ª is a fragmentary view showing a main spring attachment relative to Fig. 9;

Fig. 9 is a sectional view along line *c* of Fig. 8;

Fig. 10 is a blank used to form the supplemental barrel;

Fig. 11 is a fragmentary view of a blank showing a modification;

Fig. 12 is a fragmentary view similar to Fig. 10 of a modified form of blank;

Fig. 13 is a fragmentary sectional view showing the blank of Fig. 11 in its formed condition;

Fig. 14 is a side view of the structure shown in Fig. 8;

Fig. 15 is a fragmentary view similar to Fig. 1 showing my structure applied to a sectional barrel, the main spring being wound up from the outer coil;

Fig. 16 is a top view of a modified form of supplementary barrel;

Fig. 17 is a sectional view of a barrel provided with the supplemental barrel of Fig. 16;

Fig. 18 is a fragmentary view of a pawl controlling mechanism;

Fig. 19 is a view similar to Fig. 15 of a modified form thereof;

Fig. 20 is a transverse sectional view of a modified barrel structure having a loosely mounted ratchet wheel;

Fig. 21 is a fragmentary top view of the loosely mounted ratchet wheel;

Fig. 22 is a transverse sectional view of a sectional barrel having a loosely mounted ratchet wheel;

Fig. 23 is a fragmentary top view of a sectional barrel showing means for associating the loosely mounted ratchet wheel therewith, and Fig. 24 is a fragmentary view of the loosely mounted ratchet wheel showing means for associating it with the sectional barrel.

Referring more particularly to Fig. 1, I show a front plate 1 and back plate 2, these two plates forming part of the rigid structure of the usual watch movement. A main arbor 3 is pivotally carried by bearings 4 and 5 mounted respectively in the plates 1 and 2. This arbor 3 is thus provided with adequate bearing facilities within the rigid portions of the movement. The arbor 3 has rigidly secured to it preferably by being screw threaded thereon a main spring barrel 6. This main spring barrel carries an annular main wheel structure comprising the main wheel 7 from which projects the annular flange 8 rounded at its lower extremity to engage the rounded surface of the barrel 6. A cover plate 9 having a driving fit in the flange 8 holds this main wheel structure in position together with the rounded extremity thereof at its opposite end. The main wheel structure is slidably arranged about the barrel 6. In order to provide driving facilities between the barrel and the main wheel structure, I utilize prongs 10 preferably punched from the material of the barrel 6, which prongs are adapted to enter depressions 11 as the barrel drives the main wheel structure. Should a breakage recoil occur, then these prongs 10 act like ratchet teeth and permit a reverse rotation of the barrel 6 without carrying the main wheel structure with it. The structure further includes the winding wheel 12, which winding wheel is rigidly secured to a sleeve 13. This sleeve 13 finds bearing upon a bearing sleeve 14, which annular bearing sleeve in the structure of Fig. 1 forms part of the front plate 1. The sleeve 13 thus may rotate without exerting any pressure upon the arbor 3. The winding wheel 12 may of course be suitably rotated during the winding operation to wind up the spring as is customary. The sleeve 13 carries near its lower extremity a finger 15, which finger is beveled longitudinally of the arbor 3 as seen more clearly in Fig. 4, and which finger is adapted to engage the inner extremity of the spring. Thus this structure permits the removal of the front plate 1 together with the sleeve 14 whenever it is desired for purposes of repair. Thereafter the winding wheel sleeve 13 together with the winding wheel may be removed and the beveled condition of the finger 15 permits this removal without carrying the spring with it. The same beveled arrangement permits the spring again to be readily placed in position. To facilitate this introduction the sleeve 13 is beveled at its lower extremity as at 16. The other extremity of the spring is suitably held by the finger 17.

Referring more particularly to Fig. 3, I show a modified form of structure in which the sleeve 14 is separate from the front plate 1, but is held in place by the same screws 18 which hold the bearing 4.

In Fig. 5 I show a modified form of securing the winding wheel in position upon the sleeve 13, this winding wheel 12 resting upon a shelf 19 forming part of the sleeve 13, it being held in place by the screw 20, the sleeve 13 having its circular continuity broken as at 21 to accommodate a projection 22 forming part of the winding wheel 12. The sleeve 14$^b$ in this particular structure is screwed to the front plate 1 and itself carries the bearing 4.

In Fig. 8 I show the barrel and winding parts reversed so that the winding wheel 12 is in close proximity to the back plate 2 and the barrel is in close proximity to the front plate 1, thus to accommodate for those models where the winding wheel is to be in close proximity to the dial, showing the interchangeability of the structure. A further modification is disclosed herein in what I may term a supplemental barrel, which supplemental barrel is carried within the main barrel 6$^a$. This supplemental barrel 23 is preferably constructed from a blank as shown in Fig. 10, the base plate portion 24 whereof having fingers 25$^a$ adapted to engage recesses 26$^a$ in the barrel structure 6$^a$ for driving purposes and recoil purposes. The base portion 24 likewise has projecting segments 25, 25, 25, which are adapted to be bent rectangularly to the plate 24 when in the condition shown in Figs. 8 and 9, these segments 25 being then rounded and bent inwardly as shown more clearly in Fig. 9 so that these fingers may serve as resilient abutting surfaces for the spring should said spring act violently thereagainst when a recoil such as may be caused by the breaking of the spring takes place. One of the segments 25 further has a finger 26 punched therefrom to hold one extremity of the spring 27. The base plate 24 further has a lip 28 punched therefrom shown more clearly in Fig. 9 which is adapted to give the spring a more gradual sweep from its point of support, namely the finger 26, thus preventing the extremity of the spring which engages the finger 26 from extending therefrom in a straight line more or less radially. Breakage of parts is thus avoided. The sleeve 13 has a recessed portion as at 29 to accommodate the extremity of the spring 27, a finger 30 holding this end of the spring in position. There is thus provided a strong round surface for the second convolution of the spring as it is being wound about the said sleeve 13. The recessed portion 29 gradually slopes so that during a recoil no sharp corners of the sleeve 13 act against the spring to cause breaking the end of the spring in letting down the power.

In Figs. 11 and 13, I show a further modification of the blank 24$^a$ in that two lips 28$^a$ are provided which may serve to confine the spring similarly to the lip 28 of the blank 24.

In Fig. 12, I show a further modification of blank 24$^b$ in which the segments 25$^b$ have spring fingers 31 which may provide resilient fingers intermediate the ends of the segments 25$^b$.

In Figs. 16 and 17, I show a further modified form of supplemental barrel structure. The main barrel 6$^b$ is held in place fixedly upon the arbor 3 in any suitable manner, for instance, as shown, and has a hub 32, which hub has an annular recess 33. This annular recess is adapted to accommodate the supplemental barrel 34, which supplemental barrel has the side wall 35 carrying the driving fingers 36. The base portion of this supplemental barrel is generously perforated by slots 37, thus forming three centrally located segments 38 which are adapted to be sprung into position in the annular recess 33. Thus the supplemental barrel 34 itself is resiliently mounted to accommodate any side thrust on the arbor 3.

In Fig. 18, I show the winding wheel 12 as provided with a holding pawl 39 mounted upon a pin 40, there being an elongated slot 41 in the pawl structure. This pawl has a tail piece 42 carrying a pin 43. Now whenever it is desired to let down the power, then the pin 43 is moved along the slot 44 into the extreme position 45 of the slot 44. The back pressure of the main spring still holds the pawl in position however until such a time as the repair man attempts to wind up, whereupon due to the position of the pin 43, the pawl 39 is withdrawn and the spring may be gradually permitted to uncoil.

In Fig. 15, I show my improved structure as applied to a segmental barrel in which the main drive wheel 7 forms the lower half 46 of the barrel, and in which the winding wheel 12 is fastened to the upper half 47 of the barrel. In this particular structure the spring is wound from the outer end, the barrel section 47 being rotated by the winding wheel. The ratchet wheel 12 is provided with an annular sleeve or apron 48 which bears upon the annular bearing sleeve 14, which is fastened as shown to the front plate 1. In this structure the inner main spring coil is attached to the hub portion of the main wheel barrel 46.

In Fig. 19 the upper half 47 of the barrel projects into the lower half 46. The lower main wheel half of the barrel is fixedly assembled with the arbor 3 by the screw threaded nut 13$^d$ which also serves for an anchor of the inner coil of the main spring which is attached to the hook 15.

The improvement is applicable to watches in which the winding mechanism is disposed in an upper two part bridge combination, and Figs. 20 and 22 show my structure applied to such models. In Fig. 20 my depending tubular support 14 for the hollow winding sleeve 13 is a part of the lower bridge 1$^a$, while the uppermost bridge section 1 supports the journal for the upper bearing 4 of the arbor 3. In this structure I preferably associate the ratchet wheel 12 loosely upon a shaped-off portion 13$^a$ as shown in Fig. 21, so that it may actuate sleeve 13 during process of winding. The ratchet wheel 12 has a cupped out central portion so as to provide space for the journal mounting 4$^a$ which may be essential for thin compact models. When it is desired to remove the barrel, all that is required is to remove screws 49 and lift off bridge 1 and wheel 12 is free, and the removal of bridge 1$^a$ permits the entire structure and all bearings to be separated for cleaning or repairs. This structure further permits arbor 3, barrel 6, the main spring, sleeve 13, and cover 9 to be assembled as a unit ready for assemblage with bridge 1$^a$, after which the placing of wheel 12 leaves the entire structure locked so that arbor 3 is guided home into assemblage with its interacting journal 4 in bridge 1.

Fig. 22 shows the same bridge structure applied to a sectional barrel in which the depending support sleeve 14 is part of the bridge 1 and extending down for axial support of the barrel section 47 at the point of the main spring pull. In this structure I also preferably removably associate ratchet wheel 12 with the upper barrel section 47, yet permitting a permanent support for the main spring draw and the winding up action. The prongs 12ª enter the apertures 47ª as shown in Figs. 22, 23 and 24, and may rotate the barrel section 47, but may be readily withdrawn therefrom upon removal of bridge 1. Bridge 1ª in this case serves to automatically aline various barrel structures for assemblage with bridge 1 and the raised circular tracks 50 may further assist in this particular.

From what has thus been described the nature of my invention will be readily clear to those skilled in the art. Having however thus described my invention, what I claim as new and desire to secure by Letters Patent is:

1. In a time piece, the combination of a main spring barrel, an arbor on which said barrel is mounted, bearings for said arbor mounted upon rigid portions of the movement of said time piece, a winding wheel, a winding sleeve upon which said wheel is mounted, means associated with said sleeve for engaging the main spring, and a bearing sleeve for said winding sleeve fixedly secured to a rigid portion of the movement of said time piece, said bearing sleeve surrounding said arbor and extending inwardly to a point opposite that portion of the winding sleeve which takes the thrust of the main spring.

2. In a time piece, the combination of a main spring barrel, a main spring therein, a winding sleeve having a recessed portion, a finger on said winding sleeve for engaging the inner end of said spring, said finger being beveled so as to automatically disengage said spring when the sleeve is moved transversely into or out of said barrel, and a shoulder on said sleeve adjacent said recessed portion for guiding the second convolution of the spring over said finger and the spring end engaged therewith.

3. A watch movement comprising a main spring barrel, a main arbor rotatably supporting said barrel, said arbor being supported at its ends by rigid portions of the watch movement, a bearing sleeve surrounding said arbor but spaced therefrom, a winding sleeve supported by said bearing sleeve, a main spring, a finger on said winding sleeve for engaging the inner end of the spring, and means for securing the outer end of the spring to said barrel, the end of said winding sleeve being beveled so that it may be freely moved into position within said spring and said finger being beveled so that it will automatically engage and disengage the spring as the winding sleeve is inserted and withdrawn.

4. In time pieces, the combination of a spring barrel, a main arbor, a winding wheel, a sleeve upon which said winding wheel is mounted, a main spring, means associated with said sleeve for engaging the main spring, and a bearing sleeve for said winding wheel sleeve fixedly secured to a rigid portion of the movement of said time piece, said bearing sleeve loosely surrounding said arbor and extending inwardly to a point opposite that portion of the sleeve which takes the thrust of the main spring, and said winding sleeve being beveled at its lowermost extremity to facilitate its insertion within the main spring.

5. In time pieces, the combination of a main spring barrel, a main arbor, two bearings for said main arbor mounted upon rigid portions of the movement of said timepieces, a winding wheel, a sleeve upon which said winding wheel is removably mounted, a main spring, means associated with said sleeve for engaging the main spring, a bearing sleeve for said winding wheel sleeve fixedly secured to a rigid portion of the movement of said timepiece, said bearing sleeve loosely surrounding said arbor, and extending inwardly to a point opposite that portion of the sleeve which takes the thrust of the main spring, and spring fingers formed on the walls of said barrel to compensate for the thrust of a broken spring.

6. In time pieces, the combination of a main spring barrel, a main arbor, two bearings for said main arbor mounted upon rigid portions of the movement of said time piece, a winding wheel, a sleeve upon which said winding wheel is mounted, a main spring, means associated with said sleeve for engaging the main spring, a bearing sleeve for said winding wheel sleeve fixedly secured to a rigid portion of the movement of said time piece, said bearing sleeve loosely surrounding said arbor and extending inwardly to a point opposite that portion of the sleeve which takes the thrust of the main spring, a beveled finger on the winding sleeve to engage the inner end of the spring as the winding sleeve is inserted within the spring and a shoulder on the winding sleeve adjacent said finger to guide the second convolution of the spring over said finger.

7. A time piece comprising a main spring, a main spring barrel to which the outer end of the spring is secured, a winding sleeve projecting within said barrel, means to support said barrel and sleeve, a finger on said sleeve to engage the inner end of the spring, and means adjacent said finger to guide the second convolution of the spring over said finger.

8. In a time piece the combination of a main wheel, a main spring, a barrel for said spring, means on said barrel to engage the end of the spring and means on the barrel to prevent said main spring from bending inwardly near its point of engagement with said barrel.

9. A time piece comprising a main spring, a main spring barrel to which the outer end of the spring is secured, a winding sleeve projecting within said barrel, means to support said barrel and sleeve, a finger on said sleeve to engage the inner end of the spring, and a beveled shoulder adjacent said finger to guide the second convolution of the spring over the finger.

In witness whereof, I hereunto subscribe my name this 31st day of August.

HELGE A. BORRESEN.

Witnesses:
MAX W. ZABEL,
HAZEL A. JONES.